United States Patent

[11] 3,578,292

| [72] | Inventor | Aubrey V. Montague<br>1190 Atwater Ave., Port Credit, Ontario, Canada |
|---|---|---|
| [21] | Appl. No. | 792,393 |
| [22] | Filed | Jan. 21, 1969 |
| [45] | Patented | May 11, 1971 |

[54] PORTABLE MIXER
8 Claims, 5 Drawing Figs.

[52] U.S. Cl........................................................ 259/177, 259/171
[51] Int. Cl........................................................ B01f 9/04
[50] Field of Search.......................................... 259/170, 173, 175, 176, 177, 3, 14, 30, 57, 84

[56] References Cited
UNITED STATES PATENTS

| 1,475,904 | 11/1923 | Vandenplas.................. | 259/177 |
| 2,599,852 | 6/1952 | McClain........................ | 259/177 |
| 2,813,705 | 11/1957 | Parish............................ | 259/176 |
| 2,944,799 | 7/1960 | Larson........................... | 259/177 |
| 2,981,524 | 4/1961 | Yager............................. | 259/177 |

*Primary Examiner*—Robert W. Jenkins
*Attorneys*—Arne I. Fors and Frank I. Piper

ABSTRACT: A lightweight and portable mixing machine having a two-stage speed reduction system wherein a cylindrical vessel is supported for rotation by a drive shaft for a one-stage speed reduction and said drive shaft is operatively connected to a prime mover by a pulley-belt arrangement for a second-stage speed reduction.

INVENTOR.
AUBREY V. MONTAGUE

Patented May 11, 1971

INVENTOR.
AUBREY V. MONTAGUE

BY Arne J. Fors

Agent

PORTABLE MIXER

BACKGROUND OF THE INVENTION

The present invention relates to mixing machines and more particularly to lightweight and portable mixing machines especially suitable for use in mixing small to medium quantities of cement, mortar and similar materials.

There is a considerable need for a lightweight and portable mixing machine which can be used by householders, farmers and others for mixing small quantities of cement and the like. Such machines have previously been proposed but many of the previously proposed machines have had the very serious disadvantage of involving the use of relatively complicated speed-reducing mechanisms in their drive chains with the result that the machines were not only relatively expensive to manufacture and purchase but were also costly to maintain.

It is accordingly a principal object of the present invention to provide a lightweight and portable mixing machine having a relatively simple and inexpensive construction.

It is another object of the present invention to provide a lightweight and portable mixing machine having a novel and highly effective but simple speed-reducing system in its drive transmission.

Yet another object of the present invention is to provide a mixing machine which, by virtue of the simplicity of its construction, is relatively simple and inexpensive both to manufacture and to maintain.

SUMMARY OF THE INVENTION

These and other objects are achieved in accordance with the present invention by the provision of a lightweight and portable mixing machine comprising a frame having rotatably mounted therein an elongated and inclined drive shaft adapted supportingly and drivingly to engage the peripheral undersurface of a first generally cylindrical vessel having a base and a longitudinal axis and disposable with said axis substantially parallel to said drive shaft in the same vertical plane as said drive shaft, circular drive transmission means coaxially secured to said drive shaft corotatably therewith and adapted to be driven, second support means adapted to engage said base of said first generally cylindrical vessel to permit rotation of said vessel about said axis, and third support means comprising a pair of rotatable members adapted to engage said first generally cylindrical vessel peripherally on opposite sides of said vertical plane to maintain said vessel in driving engagement with said supporting drive shaft and to maintain said longitudinal axis of said vessel in said vertical plane.

Other objects and advantages of the invention will become apparent as the description proceeds.

Although a mixing machine according to the invention may be provided without the aforementioned first generally cylindrical vessel so that the machine can be utilized with the user's own vessels or drums, such a vessel may in accordance with one particular feature of the invention be considered to be a component part of the machine. Such a vessel may also be permanently but rotatably secured within the machine usefully by means of an axially rearwardly extending shaft integrally formed on the outer surface of the base of the vessel and extending through the aforementioned second support means. In this construction, the mixing of the materials such as cement may be carried out in the first generally cylindrical vessel itself or a second generally cylindrical vessel may be provided for this purpose. In such a case, the materials to be mixed are first placed in the second vessel which is then inserted into the first vessel to be driven rotatably thereby. If desired, the such a mixing vessel may be provided with internal vanes or baffles to facilitate mixing of the contents. The removable vessels may also be provided with handles so that they can readily be carried to the locations where the mixed materials are required.

Each of the aforementioned pair of rotatable members constituting the third support means is usefully formed by at least one cylindrical member freely rotatably mounted on a shaft substantially parallel to the drive shaft, i.e. first support means, so as to engage the first generally cylindrical vessel peripherally to urge the latter into driving engagement with the drive shaft. Such shafts in the third support means may each usefully be slidingly supported on a radially inclined surface and one or more helical tension springs secured to both the frame of the machine and to such a shaft may be provided to urge the rotatable members into peripheral contact with the aforementioned first generally cylindrical vessel in turn to urge said vessel vertically downwardly into contact with the drive shaft.

One important advantage of the described support system is that it provides in a relatively simple manner a positive driving engagement between the first generally cylindrical vessel and the drive shaft. The support system also has an inherent centering action.

Referring next to the drive transmission system, it should be understood that the circular drive transmission means coaxially secured to the drive shaft corotatably therewith may be driven in any convenient manner. It is not necessary for a mixing machine according to the invention to be provided with its own motive power source and many users may in fact prefer to purchase such a machine without a prime mover. On the other hand, the machines may be provided with their own motive power sources such as electric motors. Such a motor can usefully be provided with a driving pulley secured to its rotatable drive spindle and such a driving pulley may be connected by a belt to a driven pulley constituting the aforementioned circular drive transmission means provided on the drive shaft. In such a construction, it will also be useful to provide additionally a belt-tensioning means for maintaining the belt in driving engagement with both the driving pulley and driven pulley.

In accordance with yet another useful feature of the invention, such a belt-tensioning means may be constituted by a bracket adapted to support an electric motor pivotally about a generally horizontal axis whereby the weight of the motor serves to provide the required belt-tensioning force.

One particular advantage of the drive system hereinbefore described is that it provides an effective speed-reducing system of a relatively uncomplicated construction as will be explained in greater detail hereinafter with reference to a specific construction to be described in greater detail.

Yet another important feature of the invention is the provision of a generally cylindrical vessel having a peripheral mesh wall, which vessel can be inserted into the generally cylindrical vessel which is driven by the drive shaft. This vessel with a mesh wall can be used for securing a container therewith so that the contents of the container can be thoroughly mixed and agitated. To this end, an extensible clamp means is extended internally across the vessel, hooking at its ends to the mesh wall, removably to retain therein the container which may, for example, be a can of paint. The use of the extensible clamp which can be hooked to the mesh wall at any appropriate position permits the mesh walled container to be used for holding containers of a wide range of sizes.

DESCRIPTION OF THE DRAWINGS

The invention will now be described merely by way of illustration with reference to the accompanying drawings, in which.

Like reference characters are used in all the FIGS. of the accompanying drawings for identifying corresponding structural parts.

DESCRIPTION OF THE PREFERRED EMBODIMENTS

Figure 1:
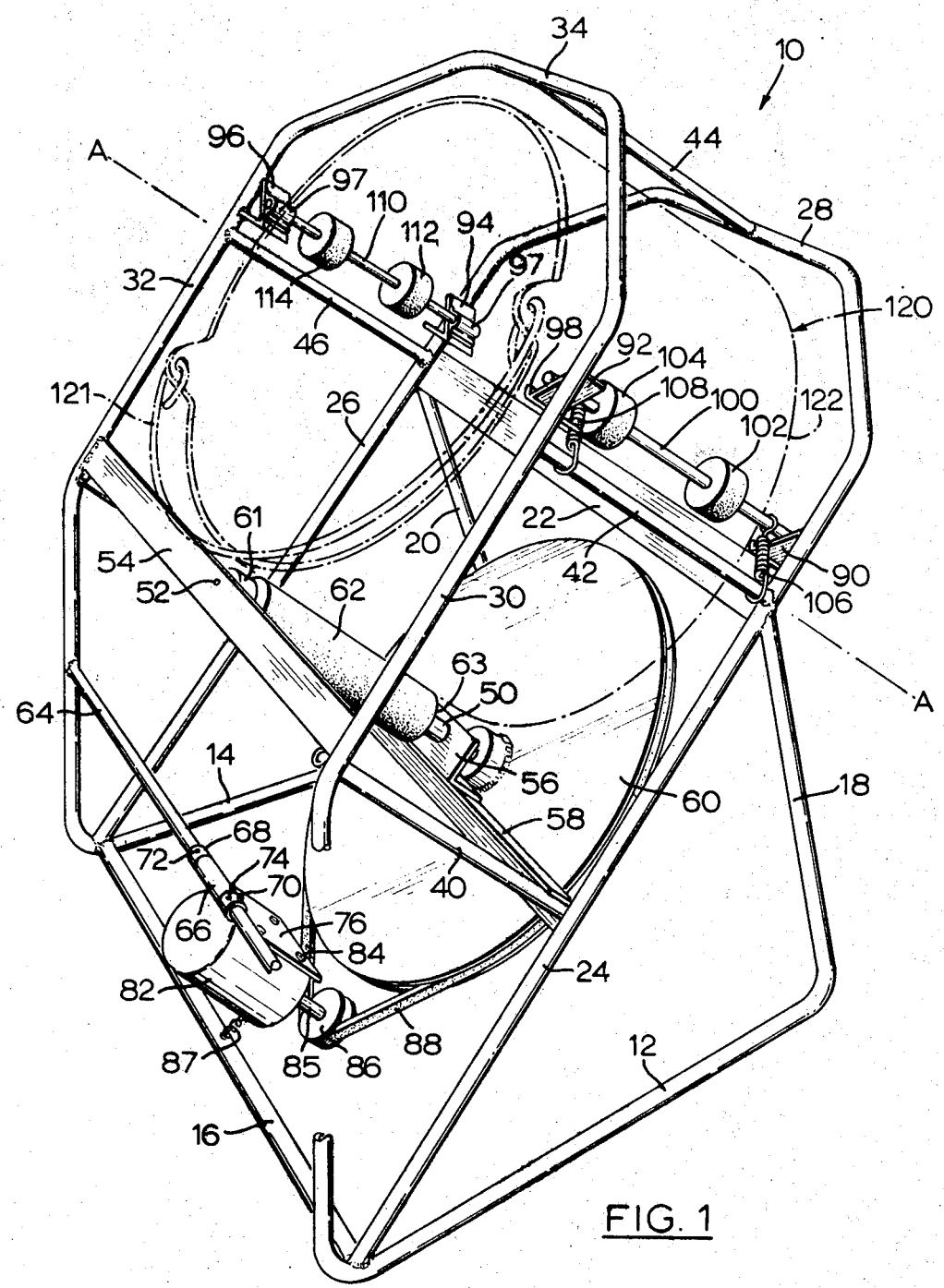
FIG. 1 is a front perspective view of one simple embodiment of a lightweight and portable mixing machine in accordance with the invention, showing a mixing drum in ghost lines.

Referring first to FIG. 1, it will be seen that the simple embodiment indicated generally therein at 10 of a lightweight and portable mixing machine in accordance with the invention comprises a tubular metallic framework having lateral ground-engaging members 12 and 14 and a front transverse ground-engaging member 16. At their rearward ends, the ground-engaging members 12 and 14 are integrally formed with rear upright members 18 and 20 respectively. The upper ends of these upright members 18 and 20 are connected together by a transverse strap 22 which also serves as the second support means hereinbefore referred to in a manner which will be explained in the description which follows.

A lower inclined frame comprising side members 24 and 26 and an upper crossmember 28 is secured to the forward ends of the ground-engaging members 12 and 14 and to the upper ends of the rear upright members 18 and 20. It will be seen from FIG. 1 that the crossmember 28 is made up of three angularly disposed sections. Other constructions for this member are of course possible; it may, for example, have a curved, e.g. semicircular, configuration, or it may simply be a straight transverse member.

Upwardly and forwardly of the frame made up of members 24, 26 and 28, there is disposed an upper inclined frame having side members 30 and 32 and an upper crossmember 34. This second frame is supported by frame members 36 and 38 extending from the forward end of the ground-engaging members 12 and 14 respectively to the lower ends of side members 30 and 32 respectively. Further support for the second frame is provided by inclined spacing members 40, 42, 44, 46 and 48 interconnecting the first frame made up of members 24, 26 and 28 and the second frame made up of members 30, 32 and 34.

It will be seen by further reference to FIG. 1 that the framework illustrated therein is essentially completely constructed as a tubular metallic structure and that several of the frame structural members are each constituted by a single piece of tube bent to the required configuration. For instance, a single piece of tube may be suitably bent to form the members 18, 12, 36, 30, 34, 32, 38, 14 and 20. The several structural members may be secured together in any appropriate manner, for instance, by welding. Although the framework of all the machines illustrated in the accompanying drawings have been shown to be of a tubular metallic construction, it will be appreciated that the use of nontubular construction is also within the scope of the present invention.

Referring further to FIG. 1, it will be seen that the machine 10 illustrated therein comprises an elongated and inclined drive shaft 50 rotatably journaled at its forward end at 52 centrally in a transverse strap 54 interconnecting the members 30 and 32. At its rearward end, the shaft 50 passes through a circular opening in a length of angle iron 56 secured to a transverse angle iron 58 interconnecting frame members 24 and 26. Rearwardly of angle iron 56, the shaft 50 is secured coaxially to a driven pulley 60 constituting the circular drive transmission means hereinbefore mentioned. A resilient sleeve 62 is secured on shaft 50 in any appropriate manner, for example, by an adhesive bond, and this sleeve 62 serves in a manner which will be explained hereinafter in greater detail for imparting drive motirion to and supporting a mixing drum or vessel used in conjunction with machine 10. Spacers 61 and 63 are disposed axially in front of and behind the sleeve 62.

Transversely disposed between the front upright frame members 36 and 38, there is provided and secured a rod 64 having a generally circular cross section. Intermediate the ends of this member 64, a coaxial sleeve 66 is disposed therearound and this sleeve 66 is maintained in its central transverse position by collars 68 and 70 secured to members 64 by screws 72 and 74. Secured to the sleeve 66 by a weld and extending rearwardly therefrom, there is a plate 76 which is secured by screws 84 to an electric motor 82 having a rearwardly projecting drive spindle 85 having secured thereto a driving pulley 86. Drive from the motor 82 is transmitted from spindle 85 by means of a continuous belt 88 trained around the driving pulley 86 and the driven pulley 60. The necessary belt tension for ensuring driving engagement between the belt 88 and the pulleys 60 and 86 is provided in the construction illustrated by tension spring 87 which is connected to the motor 82 and tubing member 16 and by the weight of the motor 82 which cause the latter to pivot downwardly about transverse rod 64 so tensioning the belt 88. Although the machine 10 has been described as being provided with pulleys 60 and 86 having a belt 88 trained therearound, it will be appreciated that it is within the scope of the present invention to utilize other drive transmission means for transmitting the drive motirion from the motive power source to the drive shaft 50. It is, for instance, possible to utilize gear wheels having a chain trained therearound instead of the belt 88 and the pulleys 60 and 86. For this reason, the reference herein and in the appended claims to the use of belt means are intended to embrace the use of alternative drive transmission means such as chains.

Disposed a short distance above spacer member 42 at each end thereof, angle brackets 90 and 92 having upper inwardly and downwardly sloping surfaces are secured, for example, be welding, to frame members 24 and 30 respectively. At the lower inner edge of each of these surfaces, there is integrally formed, in the construction of FIG. 1, an upwardly directed flange or stop 98. A shaft 100 having rollers 102 and 104 freely rotatably mounted thereon is supported by brackets 90 and 92 and this shaft 100 is urged both inwardly and downwardly by helical tension springs 106 and 108 stretched between the shaft 100 and the spacer member 42. Normally, these springs will cause the ends of the shaft 100 to engage the stops 98. A pair of brackets 94 and 96 are in like manner secured to frame members 26 and 32 respectively and a shaft 110 supported by sleeves 97 rigidly secured to said brackets has rollers 112 and 114 freely rotatably mounted thereon.

The machine 10 of FIG. 1 is intended for use with a generally cylindrical vessel or drum, such as mixing drum 120, which may usefully be provided, as shown, with a carrying handle 121. When the drum 120 is inserted into the machine 10, the sleeve 62 on the drive shaft 50 engages the peripheral undersurface of the drum 120 to transmit rotational drive movement thereto in a counterclockwise direction as viewed in FIG. 1. The base 122 rests against the transverse strap 22 which constitutes the aforementioned second support means. In order to reduce the frictional engagement of the strap 22 with the base 122 of the drum 120, the strap 22 may be provided with a forwardly directed stud (not shown) for substantially axial engagement with the base 122 of the drum 120. Such frictional engagement may further be reduced by providing an axial rotational stud on strap 22.

The drum 120 is maintained in driving contact with the sleeve 62 of the drive shaft 50 by engagement of the rollers 102, 104, 112 and 114 with the outer peripheral surface of the drum 120 under the action of springs 106 and 108 of rollers 102 and 104. Since the rollers 102 and 104 on shaft 100 and the rollers 112 and 114 on shaft 110 are disposed on opposite sides of the vertical plane containing the drive shaft 50 and the longitudinal axis A-A of the drum 120 and since rollers 102 and 104 are urged inwardly, these rollers also serve to centralize the drum 120 within the machine 10, i.e. to maintain the drum 120 with its longitudinal axis A-A in the vertical plane containing the shaft 50. It will be appreciated that, when the drum 120 is being inserted into the machine 10, it will be necessary manually to raise shaft 100 against the action of springs 106 and 108.

As hereinbefore indicated, one very important advantage of the machines of the present invention is that they include a highly effective but relatively uncomplicated speed-reducing mechanism. Merely by way of illustration, it may be noted that the machine 10 shown in FIG. 1 has been operated satisfactorily using a ¼-horsepower electric motor having a normal operating speed of about 1,725 r.p.m. giving a rotational speed of approximately 35 r.p.m. for the drum 120. In this typical construction, the driving pulley 86 had a diameter of 1 inch, the driven pulley 60 had a diameter of 12 inches, the sleeve 62 surrounding the drive shaft 50 had an outside diameter of 1¾ inches, and the cylindrical vessel 120 had an outside diameter of 11⅝ inches.

The machine of the invention is particularly suited to the task of mixing small quantities of cement and mortar. It may also be utilized for mixing the liquid and liquid-solid contents of cans, such as paint. The machines in accordance with the invention may be marketed with or without an electric motor such as motor 82 and with or without the motor mounting structure already described thus permitting the use of such a machine with a separate motive power source. It will be appreciated that, for this reason, the invention embraces machines, such as machine 10, which do not include an electric motor and/or a motor supporting structure.

Figure 2:
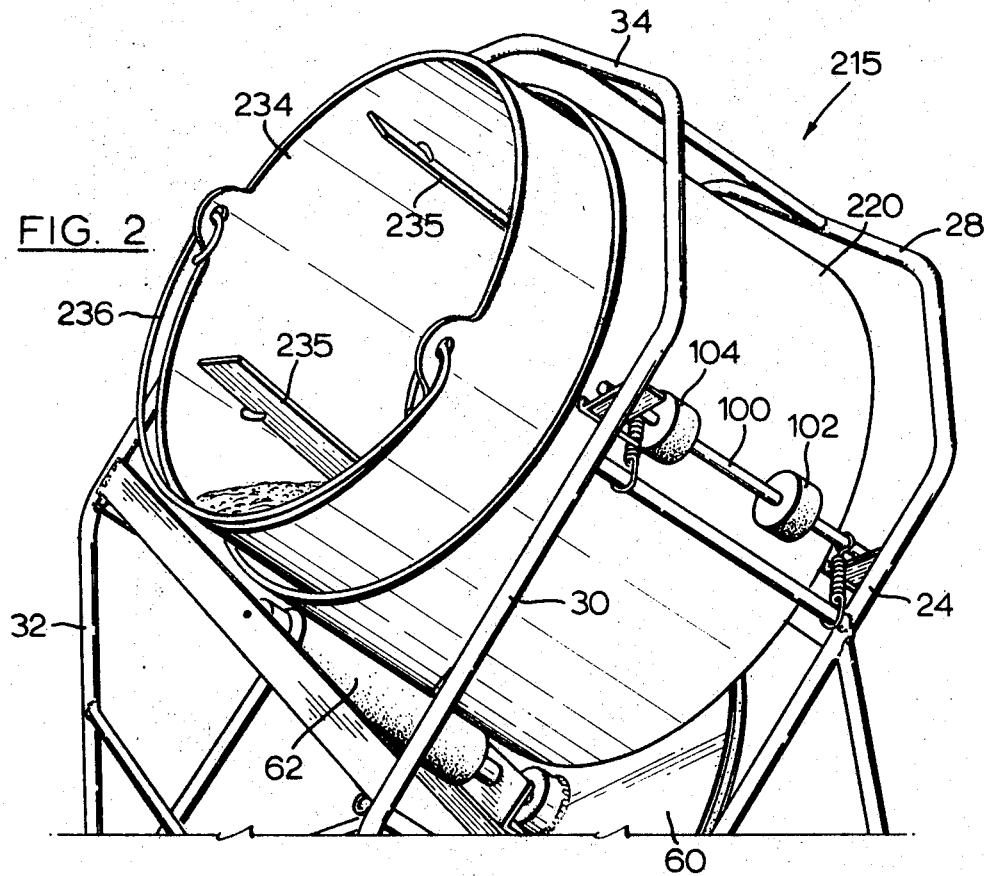
FIG. 2 is a front perspective view similar to that of FIG. 1 but illustrating a different embodiment of a mixing machine according to the invention, in which machine a first generally cylindrical drum is permanently provided and a mixing vessel removable disposed within said drum.
Figure 3:
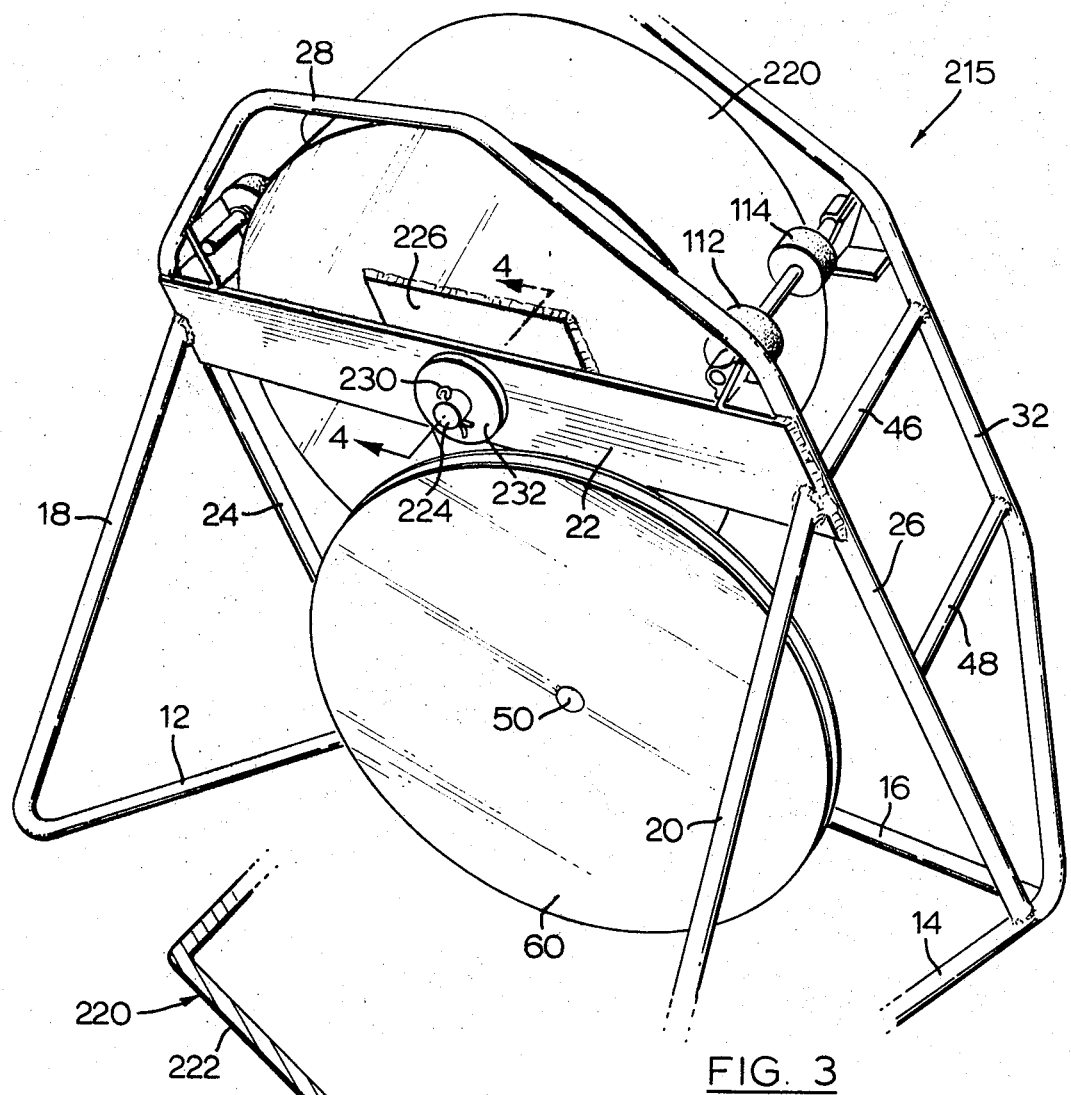
FIG. 3 is a partial rear perspective view of the machine shown in FIG. 2.
Figure 4:
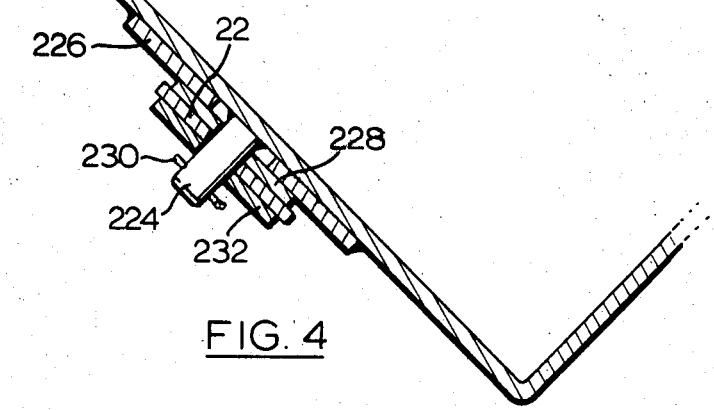
FIG. 4 is an enlarged sectional view along the line 4—4 of FIG. 3.

Although in its broadest scope, the present invention provides a novel machine which is adapted for use with a generally cylindrical vessel or mixing drum, such as drum 120, a machine in accordance with the invention may alternatively be provided with such a removable drum or, as illustrated in FIGS. 2 to 4, with a rotatable generally cylindrical vessel or drum permanently but rotatably mounted in the machine. Although such a drum may itself be used as a mixing drum for cement or other materials, it is useful to provide a separate mixing vessel or drum which may be removably inserted into the permanently mounted vessel.

Reference will now be made to the machine 215 illustrated in FIGS. 2 to 4, the construction of which machine insofar as it corresponds to that of the machine 10 shown in FIG. 1 will not be described except where it differs therefrom. The machine 215 differs essentially from the machine 10 in that a generally cylindrical vessel 220 is permanently mounted in the machine 215 for rotational movement therein. Referring particularly to FIGS. 3 and 4, it will be seen that the vessel 220 is provided on its base 22 with a rearwardly extending axial stub shaft 224. A reinforcing plate 226 is usefully secured, as by welding, to the base 222 around the stud shaft 224. A washer 228 disposed around the shaft 224 in front of the strap 22 serves to facilitate further rotation of the drum 220. The drum is held in position in the machine 215 by a split pin 230 disposed through a hole provided for this purpose at the rear end of shaft 224, a washer 232 being disposed between the strap 22 and the split pin 230.

Another difference between the machine 215 of FIGS. 2 to 4 and the machine 10 of FIG. 1 is that the stops 98 of the latter are omitted from the machine 215 since, in this machine, the rollers 102, 104, 112 and 114 permanently engage the peripheral outer surface of the vessel 220.

As hereinbefore indicated, although the drum 220 may itself be used as a mixing vessel, it is preferred to provide one or more separate mixing vessels, such as vessel 234, which may be removably inserted within drum 220. In this way, the materials which are to be mixed may be placed in the vessel 234 and then the latter may be inserted into the drive drum 220. When the required mixing of the materials has been effected, the vessel 234 may be removed and the contents thereof carried therein to the location where they are required. For this purpose, the vessel 234 may usefully be provided with a carrying handle 236. When the vessel 234 is so in use, a similar vessel containing a further batch of materials to be mixed may be inserted into the drum 220.

Figure 5:
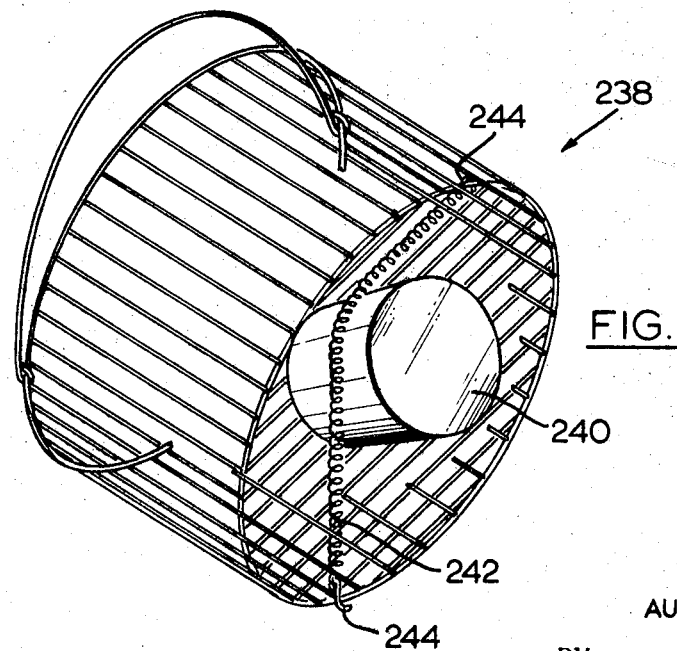
FIG. 5 is a perspective view of a generally cylindrical vessel with a mesh wall having a can of paint disposed therein, and which can be inserted into the machine shown in FIG. 1 for the purpose of mixing the paint inside the can.

In accordance with another useful feature of the present invention, the machine 215 shown in FIGS. 2 and 4 may also be provided, as an accessory thereto, with a generally cylindrical vessel having a peripheral mesh wall such as basket 238 illustrated in FIG. 5 of the accompanying drawings. Such a basket 238 may be used to adapt the machine 215 to additional uses such as to mixing the contents of cans of liquid materials. For example, a can of paint 240 may be held within the basket 238 by an extensible resilient spring 242 or the like. Such a spring is utilized in the manner shown in FIG. 5 for securing the can 240 within the basket 238 so that, when the latter is disposed within the drum 220 of the machine 215, the paint within the can 240 is moved therein from end to end to provide effective agitation and mixing thereof, particularly if a solid component of the paint, for example, a solid pigment, has previously settled to the bottom of the can. The spring 242 is usefully provided at each of its ends with a hook fastener 244. The provision of such hooks 244 permits the spring 242 to be hooked to the wall of the basket 238 at different longitudinal positions so as to retain within the basket 238 containers of different sizes. If required, the machine 215 may be provided, as yet another accessory thereto, with small clamping devices for positively locking the closures or lids onto containers, such as can 240, to ensure that such closures or lids are not accidentally displaced during the agitation of the contents of the can by its rotation in the machine 215.

Mixing vessel 234 preferably is provided with mixing vanes 235 about its inner wall to promote mixing action within the vessel. What I claim as new and desire to protect by Letters Patent of the United States is:

I claim:

1. A lightweight and portable mixing machine comprising a frame having rotatably mounted therein an elongated and inclined drive shaft adapted supportingly and drivingly to engage the peripheral undersurface of a first generally cylindrical vessel having a base and a longitudinal axis and disposable with said axis substantially parallel to said drive shaft in the same vertical plane as said drive shaft, circular drive transmission means coaxially secured to said drive shaft corotatably therewith and having a pulley, an electrically operated motive power source having a rotatable drive spindle having drivingly secured thereto a driving pulley, a belt drivingly engaging both said driving pulley and said driven pulley, and belt-tensioning means for maintaining said belt in driving engagement with said driving pulley and with said driven pulley, second support means adapted to engage said base of said first generally cylindrical vessel to permit rotation of said vessel about said axis, and third support means comprising a pair of rotatable members adapted to engage said first generally cylindrical vessel peripherally on opposite sides of said vertical plane to maintain said vessel in driving engagement with said drive shaft and to maintain said longitudinal axis of said vessel in said vertical plane.

2. A mixing machine as claimed in claim 1 in which each of said shafts on which said cylindrical members are mounted is slidingly supported on a radially inwardly and downwardly inclined surface and in which helical tension springs secured both to said frame and to said shafts on which said cylindrical members are mounted urge said cylindrical members into peripheral contact with said first generally cylindrical vessel in turn to urge said first generally cylindrical vessel vertically downwardly into contact with said drive shaft.

3. A mixing machine as claimed in claim 1 in which said belt-tensioning means is constituted by a bracket adapted to support said motive power source pivotally about a generally horizontal axis whereby the weight of said motive power source serves to provide a belt-tensioning force causing said belt drivingly to engage both said driving pulley and said driven pulley.

4. A mixing machine as claimed in claim 3 which additionally comprises an electrically operated motive power source having a rotatable drive spindle having drivingly secured thereto a driving pulley and in which said motive power source is supported by and secured to said bracket for pivotal movement about said generally horizontal axis.

5. A mixing machine as claimed in claim 1 which has a first generally cylindrical vessel, having a base and a longitudinal axis, removably disposed in said mixing machine with said longitudinal axis substantially parallel to said drive shaft and in which said vessel is rotatably supported by said second and third support means and supportingly and drivingly engaged by said drive shaft.

6. A mixing machine as claimed in claim 1 in which a second generally cylindrical vessel is removably disposed within said first generally cylindrical vessel for driving engagement therewith by engagement of the outer surface of said second vessel with the inner surface of said first vessel.

7. A mixing machine as claimed in claim 1 in which a generally cylindrical vessel having a peripheral mesh wall is removably disposed within said first generally cylindrical vessel for driving engagement therewith by engagement of the outer surface of said vessel having a mesh wall with the inner surface of said first generally cylindrical vessel and in which extensible clamp means extend internally across said vessel having a mesh wall for the purpose of releasably retaining therein a container.

8. A mixing machine as claimed in claim 7 in which said extensible clamp means is provided with at least one terminal connector for releasably securing it to the mesh wall of said vessel having a mesh wall.